US007549112B2

(12) United States Patent
Terry et al.

(10) Patent No.: US 7,549,112 B2
(45) Date of Patent: Jun. 16, 2009

(54) UNIQUE RESPONSE FOR PUNCTURE DRIVE MEDIA ERROR

(75) Inventors: Jared Terry, Austin, TX (US); Samit Ashdhir, Round Rock, TX (US); Dhiraj Sehgal, Round Rock, TX (US); Shelley L. Stracener, Round Rock, TX (US); John C. Woo, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 404 days.

(21) Appl. No.: 11/331,785

(22) Filed: Jan. 13, 2006

(65) Prior Publication Data

US 2007/0174670 A1 Jul. 26, 2007

(51) Int. Cl.
 *G06F 11/00* (2006.01)
(52) U.S. Cl. .......................................... 714/790; 714/5
(58) Field of Classification Search .................. 714/790
 See application file for complete search history.

(56) References Cited

U.S. PATENT DOCUMENTS

| 5,574,855 | A | 11/1996 | Rosich et al. .......... 395/183.17 |
|---|---|---|---|
| 5,812,753 | A | 9/1998 | Chiariotti ............... 395/182.04 |
| 6,851,022 | B2 | 2/2005 | Ikeuchi et al. ............... 711/114 |
| 6,886,108 | B2 | 4/2005 | Talagala ........................ 714/5 |
| 7,024,585 | B2 | 4/2006 | Chatterjee et al. .............. 714/7 |
| 2002/0053047 | A1 | 5/2002 | Gold ........................... 714/45 |
| 2003/0233611 | A1* | 12/2003 | Humlicek et al. ........... 714/763 |
| 2004/0128582 | A1 | 7/2004 | Chou ............................ 714/5 |
| 2006/0041793 | A1 | 2/2006 | Cherian et al. ................ 714/47 |
| 2006/0277386 | A1* | 12/2006 | Eguchi ....................... 711/170 |
| 2008/0010503 | A1* | 1/2008 | Cashman ....................... 714/6 |

* cited by examiner

*Primary Examiner*—Christopher S McCarthy
(74) *Attorney, Agent, or Firm*—Hamilton & Terrile, LLP; Gary W. Hamilton

(57) ABSTRACT

A system and method for identifying physical blocks marked as logically "bad" or "punctured" during a drive rebuild process enabling the information handling system to process these blocks more intelligently and preventing existing drive physical media errors from needlessly being copied and propagated to new drives. Various implementations of the invention allow physical blocks on a target drive to be marked as "punctured" so they can be diagnosed to verify that they have not been erroneously marked as being "bad," thereby reducing the number of misdiagnosed drive failures.

20 Claims, 8 Drawing Sheets

UNIQUE RESPONSE FOR PUNCTURE DRIVE MEDIA ERROR

BACKGROUND OF THE INVENTION

1. Field of the Invention

The present invention relates in general to the field of information handling systems and more specifically, to the management of disk storage systems.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes, thereby allowing users to take advantage of the value of the information. Because technology and information handling needs and requirements vary between different users or applications, information handling systems may also vary regarding what information is processed, stored or communicated, and how quickly and efficiently the information may be processed, stored, or communicated. The variations in information handling systems allow for information handling systems to be general or configured for a specific user or specific use such as financial transaction processing, airline reservation, enterprise data storage, or global communications. In addition, information handling systems may include a variety of hardware and software components that may be configured to process, store, and communicate information, and may include one or more computer systems, data storage systems, and networking systems.

The amount of data that information handling systems manage continues to grow, driving the need for scalable data storage systems capable of sustaining information integrity, reliability and availability. One approach to address these needs is the implementation of redundant array of independent disks (RAID) subsystem, which can share and/or replicate data across multiple disk drives, any of which can typically be replaced ("hot swapped") while the system is running. In its simplest implementation, RAID combines multiple hard drives into a single logical unit, and depending on the version implemented, it can also provide increased data integrity and fault tolerance. Implementations of RAID generally involves the use of a RAID controller, which manages the disks comprising the array, and in some versions of RAID, may also perform parity calculations for error detection and correction.

Most current computer file systems are based on the concept of a "block device," which is an abstraction of the hardware (e.g., disk drive or RAID subsystem) that stores and retrieves predetermined blocks of data. In certain versions of RAID, when a data block is written on a disk in an array, a parity block is generated within the same stripe of the array. These parity blocks are generally not read unless a data read operation results in a cyclic redundancy check (CRC) error. A CRC is a type of mathematical algorithm known as a hash function. When a data block is applied against a CRC a predetermined number of unique bits is produced, generally referred to as a checksum, that can be used to detect and correct errors within the data block. Implementation of CRCs in data storage systems is popular because they are simple to implement in binary hardware, easy to analyze mathematically, and good at detecting common errors. However, they are not as useful for distinguishing between read operation errors and disk media errors.

The original RAID specification suggested a number of RAID "levels" (e.g., 0, 1, 2, 3, 4, 5) that described the manner in which information was distributed and/or replicated across the hard disks comprising the array. Those of skill in the art will be aware that each of these commonly implemented versions of RAID provide different capabilities. For example, RAID 0 offers no redundancy or fault tolerance, but is useful for aggregating disk storage. RAID 1, generally referred to as mirroring and typically implemented with just two disk drives, offers fault tolerance by allowing the data on a failed drive to be copied to the remaining drive. RAID 2, which distributed bytes of data across disks and kept associated error correcting code (ECC) stored on additional disks, has been superseded by built-in ECC capabilities on current disk drives. RAID 3 likewise distributes bytes of data across disks, but stores parity information on a dedicated disk in the array.

RAID 4 divides information into blocks of data, which is distributed across the disk drives comprising the array. Parity information is added to each of these data blocks and is then summed into associated parity blocks. In RAID 4, the parity blocks are stored on a dedicated disk drive in the array. If one of the drives in the array fails, its contents can be recalculated and reconstructed from the parity blocks stored in the dedicated disk drive. However, the ability to restore or reconstruct a failed drive may be compromised if the disk drive dedicated to storing the parity blocks fails.

RAID 5 on the other hand, provides fault tolerance by distributing parity data across all member drives in the array. There is only one parity block per stripe, and the disk used for storing each stripe's parity block is staggered from one stripe to the next. If one of the disk drives comprising a RAID 5 subsystem fails, parity blocks from the surviving disks can be read and mathematically combined with associated data blocks distributed across the surviving disks to recover the failed drive's data. However, when a RAID 5 disk fails, the array enters a degraded state and does not regain normal operation until the failed drive is replaced and the replacement drive is rebuilt. Furthermore, if a second drive fails before the rebuilding of the replacement drive is complete there will be insufficient parity data available to reconstruct both drives, generally resulting in a failure of the RAID subsystem and a total loss of data. For this reason, many RAID 5 implementations preinstall an extra, unused disk drive that can be "hot swapped" to immediately and automatically replace a failed drive in the array. The use of such a "hot spare" disk drive can reduce the window of vulnerability during which a second drive failure could cause the RAID subsystem to fail overall.

Current approaches for rebuilding a replacement disk drive can produce undesirable results, such as one or more read errors of physical blocks on the surviving RAID drives creating logical "bad" blocks, or "punctures," on the rebuilt drive. These "punctured" blocks on the rebuilt drive, while actually "good," are reported as physically "bad" by subsequent diagnostic processes, and in sufficient quantity they can lead to a misdiagnosed drive failure. Furthermore, once a rebuilt disk drive's physical blocks have been marked as "punctured," they can propagate to subsequent replacement drives when they are rebuilt. Disk punctures, if propagated in sufficient numbers, can also cause replacement drives to report as being "failed" after rebuilding is complete, possibly causing unnecessary repeat service dispatches, and/or replacement of "failed" drives that are actually good.

Current drive rebuild approaches attempt to reduce the number of punctured blocks by minimizing the possibility of a RAID controller encountering physical bad blocks during rebuilds. But these approaches do not prevent logically created "bad" blocks from being propagated onto subsequent replacement drives. Currently, the only way to remedy this propagation is to perform a low level format on the physical disk and restore data from back-up sources. What is needed is a way to determine whether a physical block on a rebuilt disk drive that is marked "bad" is a result of an actual disk media error on the source drive, or "punctured" as a result of a read error during the drive rebuild process.

SUMMARY OF THE INVENTION

In accordance with the present invention, a system and method is disclosed for reducing the number of physical blocks marked as logically "bad" or "punctured" on a rebuilt drive during a drive rebuild process. Read errors on a disk drive, commonly referenced by a variety of error codes, can indicate that certain physical blocks of a disk's media may be flawed or that the data they contain is corrupted. In some cases, during a disk drive rebuild process, these read errors result in physical blocks on the rebuilt drive being marked as being "punctured."

In a method of an embodiment of the invention, a unique bit pattern can be combined with an error correcting code (ECC) algorithm, as commonly used to check disk drive sectors, to create a Puncture Identification Algorithm (PIA). Data contained in a physical block can then be applied against the PIA to produce a result specific to a drive "puncture." This approach allows the RAID controller to return a different error code signifying that the physical block was marked as "punctured," due to a read error on the source drive instead of a media failure. In this method of an embodiment of the invention, the data in each physical block can be applied against both a standardized, drive-specific ECC algorithm and the PIA during the process of rebuilding the disk.

If the data in the physical block passes the standardized, drive-specific ECC algorithm, then the physical block is considered "good" and the rebuild process progresses to the next physical block. If the data in the physical block fails to pass the standardized, drive-specific ECC test, it is then applied against the PIA. If the predetermined data pattern in the physical block fails to pass the PIA, a standard error code (e.g., 03 11 00—"disk media error") is returned and existing media error protocols are then followed. However, if the predetermined data pattern in the physical block passes the PIA, a new error code (e.g., 03 11 80—"failed via puncture") is returned and the physical block can subsequently be treated as "punctured."

Those of skill in the art will understand that many such embodiments and variations of the invention are possible, including but not limited to those described hereinabove, which are by no means all inclusive.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
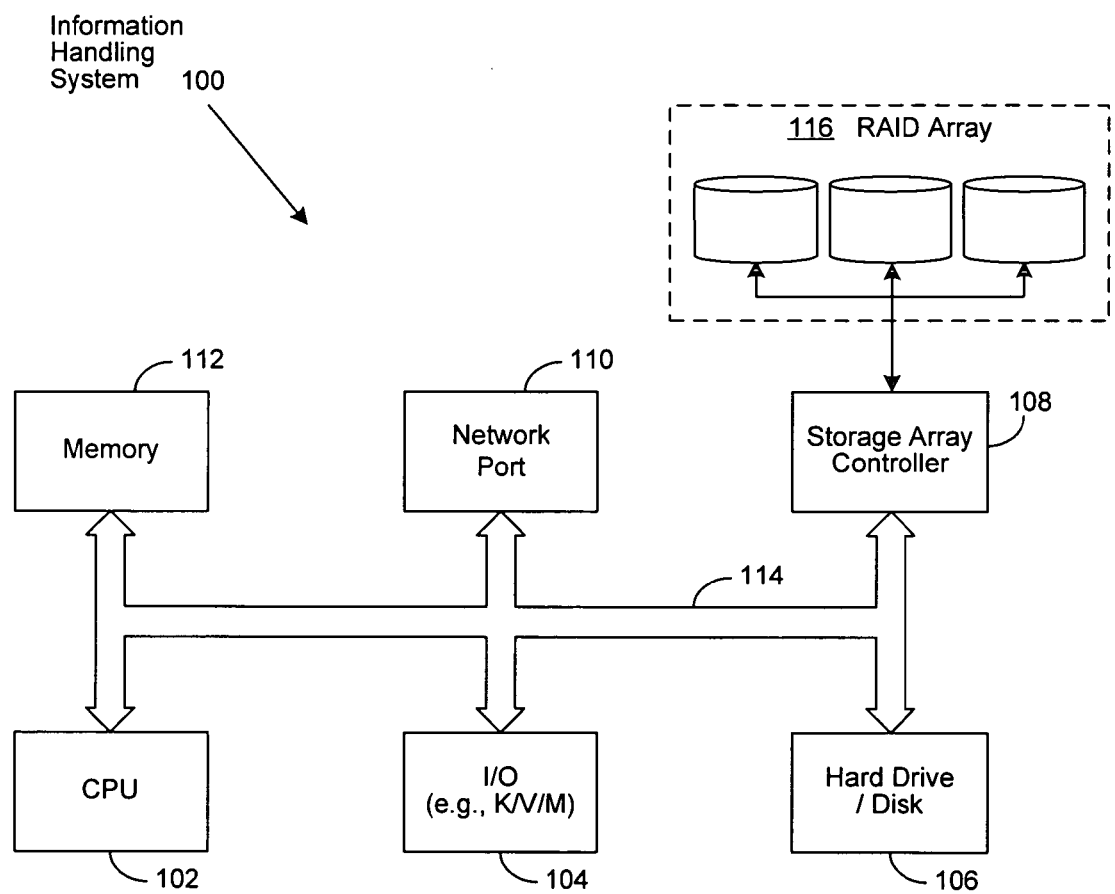
FIG. 1 is a generalized illustration of an information handling system that can be used to implement the method and apparatus of the present invention.

FIG. 1 is a generalized illustration of an information handling system 100 that can be used to implement the system and method of the present invention. The information handling system comprises a processor 102, input/output (I/O) devices 104, such as a display, a keyboard, a mouse, and associated controllers, a hard disk drive 106, other storage devices 108, such as a floppy disk and drive and other memory devices such as a storage array controller, various other subsystems 110, and network port 114, all interconnected via one or more buses 112. In one embodiment of the invention, storage array controller 108 manages two or more disk drives comprising a redundant array of independent disks (RAID) subsystem 116.

For purposes of this disclosure, an information handling system may include any instrumentality or aggregate of instrumentalities operable to compute, classify, process, transmit, receive, retrieve, originate, store, display, manifest, detect, record, reproduce, handle, or utilize any form of information, intelligence or data for business, scientific, control or other purposes. For example an information handling system may be a personal computer, a network storage device, or any other suitable device and may vary in size, shape performance, functionality, and price. The information handling system may include random access memory (RAM), one or more processing resources such as a central processing unit (CPU) or hardware or software control logic, read only memory (ROM), and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 2A:
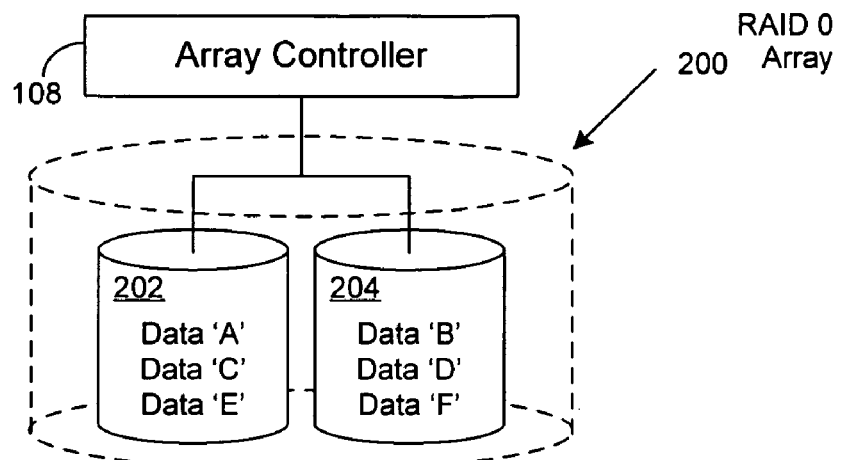
FIG. 2a is a generalized illustration of a Raid 0 subsystem, which is useful for aggregating disk storage but offers no redundancy or fault tolerance.

FIG. 2a is a generalized illustration of a Raid 0 subsystem 200, which is useful for aggregating disk storage but offers no redundancy or fault tolerance. RAID array controller 108 manages the disks 202, 204 comprising the array. Disk 202 comprises data blocks 'A', 'C', 'E' and disk 204 comprises data blocks 'B', 'D', 'F' with subsequent blocks of data being shared alternately between the two disks 202, 204 thereafter.

Figure 2B:
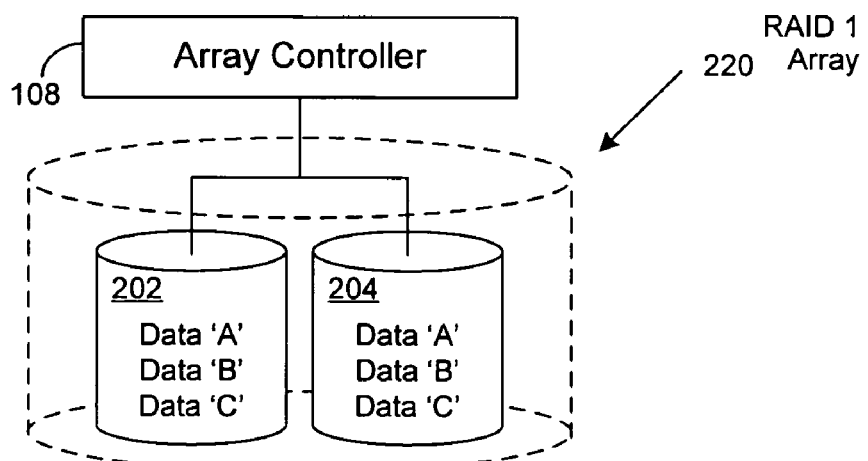
FIG. 2b is a generalized illustration of a RAID 1 subsystem, offering fault tolerance by allowing the data on a failed drive to be copied to the remaining drive.

FIG. 2b is a generalized illustration of a RAID 1 subsystem 220, generally referred to as mirroring and typically implemented with just two disk drives, offering fault tolerance by allowing the data on a failed drive to be copied to the remaining drive. RAID array controller 108 manages the disks 202, 204 comprising the array. Disk 202 comprises data blocks 'A', 'B', 'C'0 and disk 204 likewise comprises duplicated data blocks 'A', 'B', 'C' with subsequent blocks of data being similarly duplicated thereafter.

Figure 2C:
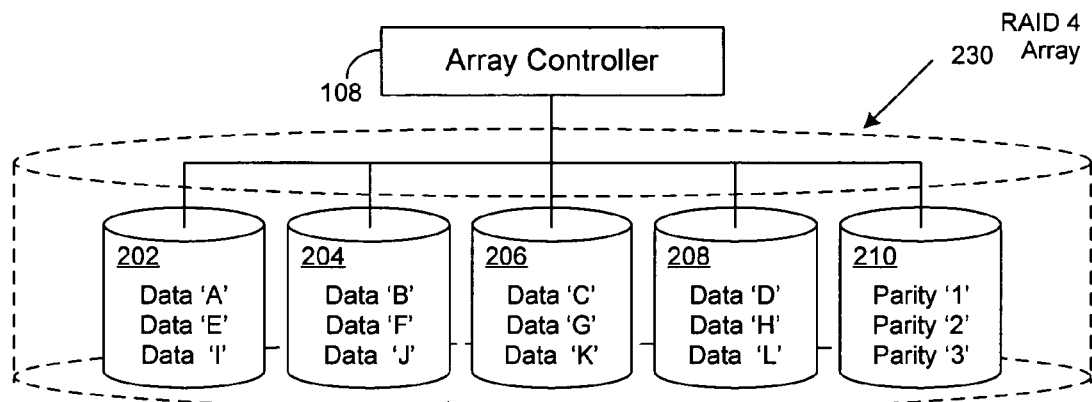
FIG. 2c is a generalized illustration of a RAID 4 subsystem, which divides information into blocks of data that can be distributed across the disk drives comprising the array.

FIG. 2c is a generalized illustration of a RAID 4 subsystem 230, which divides information into blocks of data that can be distributed across the disk drives comprising the array. Parity information is added to each of these data blocks and is then summed into associated parity blocks which are stored in a dedicated disk drive in the array. RAID array controller 108 manages the disks 202, 204, 206, 208, 220 comprising the array. Disk 202 comprises data blocks 'A', 'E', 'I'. Disk 204 comprises data blocks 'B', 'F', 'J'. Disk 206 comprises data blocks 'C', 'G', 'K'. Disk 208 comprises data blocks 'D', 'H', 'L.' Disk 210 comprises parity blocks '1', '2', '3' with subsequent data and parity blocks similarly distributed across disks 202, 204, 206, 208, 210 thereafter.

Figure 2D:
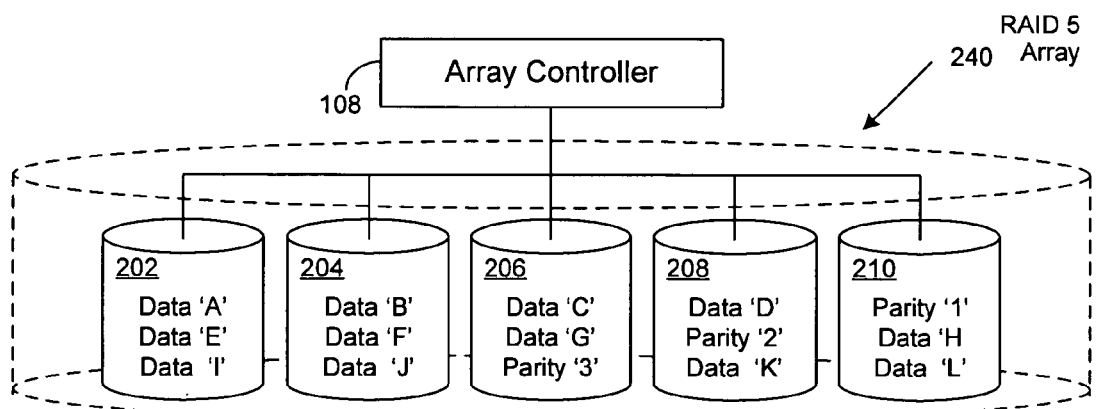
FIG. 2d is a generalized illustration of a RAID 5 subsystem, offering fault tolerance by using block-level striping with parity data distributed across the drives in the array.

FIG. 2d is a generalized illustration of a RAID 5 subsystem 240, which offers fault tolerance by using block-level striping with parity data distributed across all member drives in the array. RAID array controller 108 manages the disks 202, 204, 206, 208, 220 comprising the array. Disk 202 comprises data blocks 'A', 'E', 'I.' Disk 204 comprises data blocks 'B', 'F', 'J'. Disk 206 comprises data blocks 'C', 'G' and parity block '3.' Disk 208 comprises data blocks 'D', 'K', and parity block '2.' Disk 210 comprises data blocks 'H', 'L', and parity block '1' with subsequent data and parity blocks similarly distributed across disks 202, 204, 206, 208, 210 thereafter. Note that there is only one parity block per stripe, and the disk used for storing each stripe's parity block is staggered from one stripe to the next.

Figure 3A:
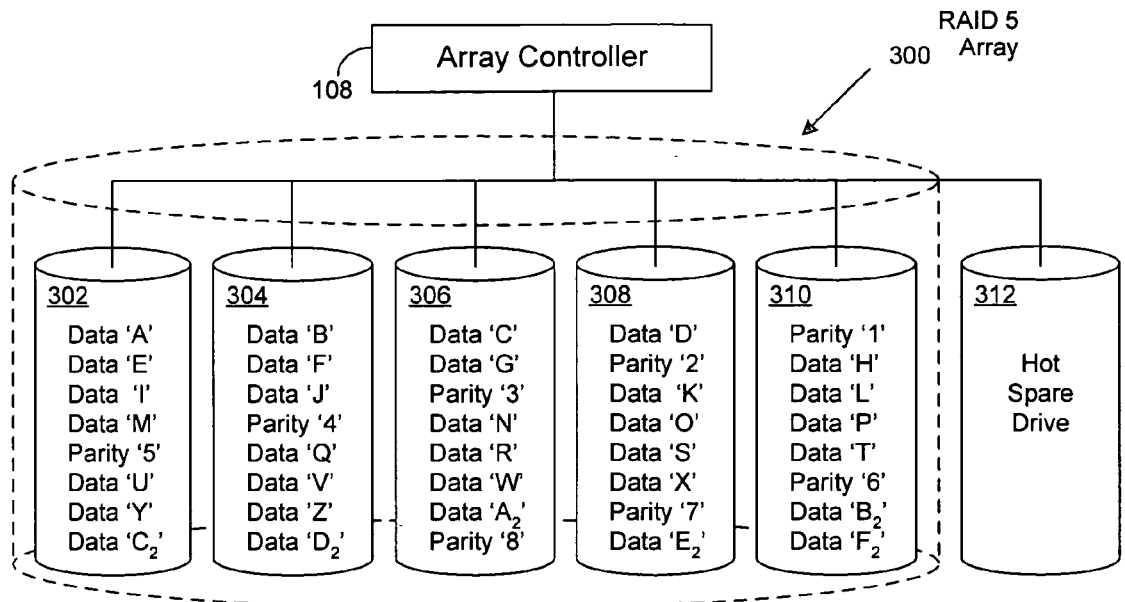
FIG. 3a is a generalized illustration of a RAID 5 subsystem as implemented with a "hot spare" drive.

FIG. 3a is a generalized illustration of a RAID 5 subsystem 300 as implemented with "hot spare" drive 312. RAID array controller 108 manages the disks 302, 304, 306, 308, 310 comprising the array as well as "hot spare" disk drive 312, which can be used to replace a failed drive in the array. Disk 302 comprises data blocks 'A', 'E', 'I', 'M', 'U', 'Y', 'C$_2$' and parity block '5.' Disk 304 comprises data blocks 'B', 'F', 'J', 'Q', 'V', 'Z', 'D$_2$' and parity block '4.' Disk 306 comprises data blocks 'C', 'G', 'N', 'R', 'W', 'A$_2$' and parity blocks '3', '8.' Disk 308 comprises data blocks 'D', 'K', 'O', 'S', 'X', 'E$_2$' and parity blocks '2', '7.' Disk 310 comprises data blocks 'H', 'L', 'P', 'T', 'B$_2$', 'F$_2$' and parity blocks '1', '6' with subsequent data and parity blocks similarly distributed across disks 302, 304, 306, 308, 310 thereafter.

Figure 3B:
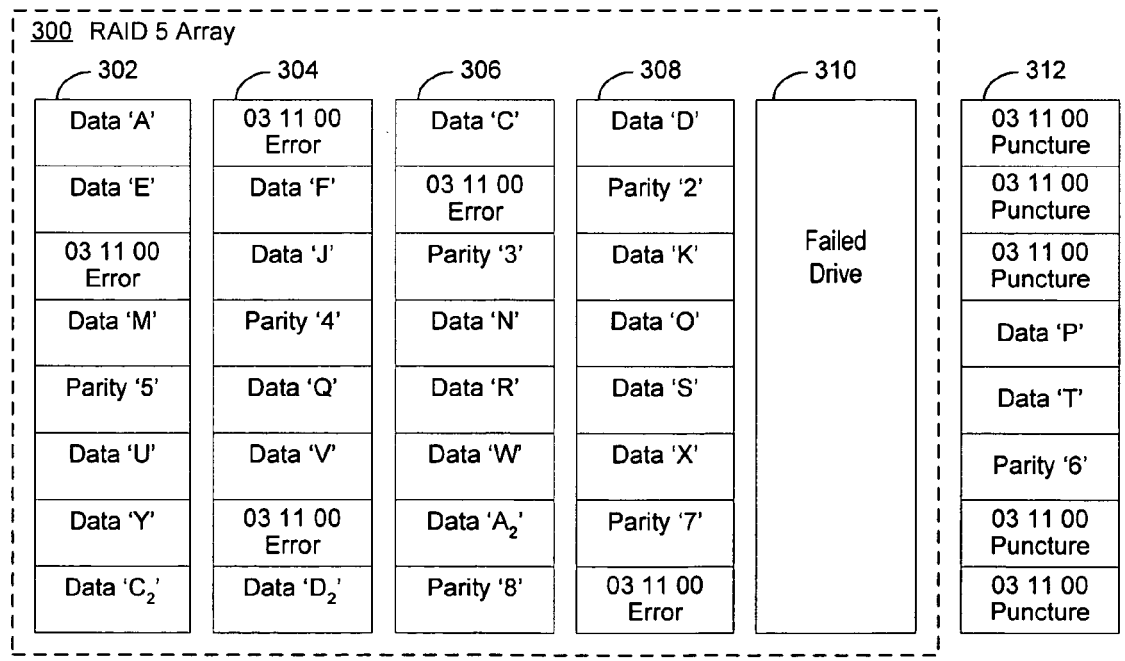
FIG. 3b is a generalized illustration of a RAID 5 subsystem where a failed disk has been rebuilt on a "hot spare" drive using current drive rebuild approaches.

FIG. 3b is a generalized illustration of a RAID 5 subsystem 300 where disk 310 in the array has failed and has been rebuilt on "hot spare" drive 312 using current drive rebuild approaches. Disk 302 comprises data blocks 'A', 'E', 'I', 'M', 'U', 'Y', 'C$_2$' and parity block '5.' Disk 304 comprises data blocks 'B', 'F', 'J', 'Q', 'V', 'Z', 'D$_2$' and parity block '4.' Disk 306 comprises data blocks 'C', 'G', 'N', 'R', 'W', 'A$_2$' and parity blocks '3', '8.' Disk 308 comprises data blocks 'D', 'K', 'O', 'S', 'X', 'E$_2$' and parity blocks '2', '7.' Disk 312 comprises rebuilt data blocks 'P' & 'T', and rebuilt parity block '6' with subsequent rebuilt data and parity blocks thereafter.

In this illustration, not only has drive 310 failed, but ECC failures have occurred in data blocks 'B', 'G', 'I', 'Z', and 'E$_2$'' causing read errors (e.g., 03 11 00—"disk media error") resulting in corresponding blocks in hot spare drive 312 to be marked "punctured" during the drive rebuild process. Note that when using current drive rebuild approaches it is not possible to determine whether the blocks are marked physically "bad" or marked "punctured" on "hot spare" drive 312 as a result of disk media errors on source drives 302, 304, 306, 308.

Figure 3C:
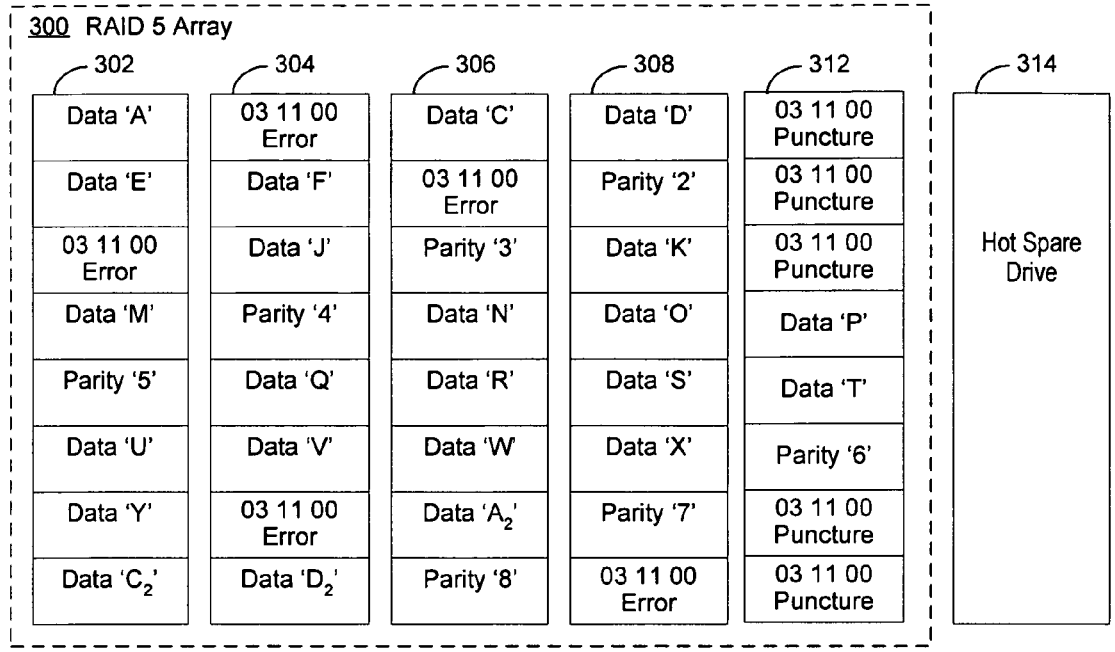
FIG. 3c is a generalized block diagram of a RAID 5 subsystem where a failed disk has been rebuilt on a "hot spare" drive using current drive rebuild approaches.

FIG. 3c is a generalized illustration of a RAID 5 subsystem 300 where failed disk 310 in the array has been rebuilt on "hot spare" drive 312 using current drive rebuild approaches, and "hot swapped" with failed disk 310, which has been physically removed from the array and replaced with a new "hot spare" disk drive 314. Disk 302 comprises data blocks 'A', 'E', 'I', 'M', 'U', 'Y', 'C$_2$' and parity block '5.' Disk 304 comprises data blocks 'B', 'F', 'J', 'Q', 'V', 'Z', 'D$_2$' and parity block '4.' Disk 306 comprises data blocks 'C', 'G', 'N', 'R', 'W', 'A$_2$' and parity blocks '3', '8.' Disk 308 comprises data blocks 'D', 'K', 'O', 'S', 'X', 'E$_2$' and parity blocks '2', '7.' Disk 312 comprises rebuilt data blocks 'P', 'T', and rebuilt parity block '6' with subsequent rebuilt data and parity blocks thereafter. In this same illustration, disk 312 also comprises blocks marked "bad" or "punctured" as a result of current drive rebuild processes described in more detail hereinabove.

Figure 3D:
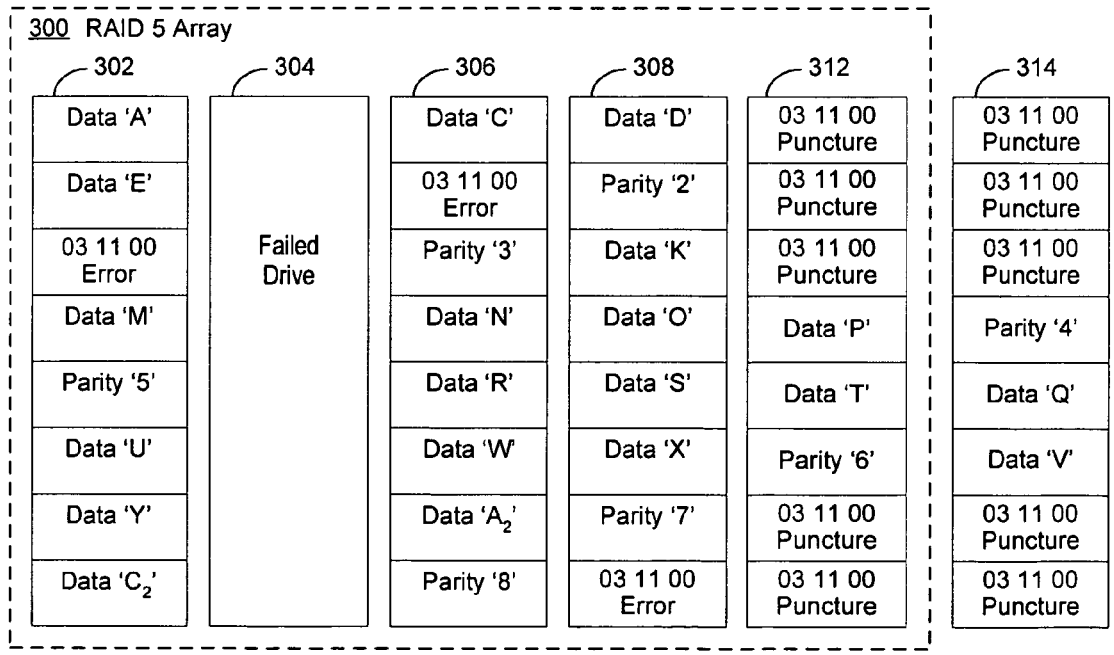
FIG. 3d is a generalized block diagram of a RAID 5 subsystem where "punctured" blocks have propagated to disk 314 as a result of using current drive rebuild approaches.

FIG. 3d is a generalized illustration of a RAID 5 subsystem 300 where "punctured" blocks from disk 312, which was used to rebuild failed disk 310, have propagated to disk 314 as a result of using current approaches to rebuild failed disk 304. Disk 302 comprises data blocks 'A', 'E', 'I', 'M', 'U', 'Y', 'C$_2$' and parity block '5.' Disk 306 comprises data blocks 'C', 'G', 'N', 'R', 'W', 'A$_2$' and parity blocks '3', '8.' Disk 308 comprises data blocks 'D', 'K', 'O', 'S', 'X', 'E$_2$' and parity blocks '2', '7.' Disk 312 comprises rebuilt data blocks 'P', 'T', and rebuilt parity block '6' with subsequent rebuilt data and parity blocks thereafter. Disk 314 comprises data blocks 'Q', 'V', and rebuilt parity block '4' with subsequent rebuilt data and parity blocks thereafter.

In this illustration, disk 312 also comprises blocks marked "bad" or "punctured" as a result of current drive rebuild processes described in more detail hereinabove. Furthermore, not only has drive 304 failed, but ECC failures have occurred in data blocks 'G', 'I', 'E$_2$'' causing read errors (e.g., 03 11 00—"disk media error") resulting in corresponding blocks in hot spare drive 314 to be marked "bad" or "punctured." These new "bad" or "punctured" blocks, when combined with existing "bad" or "punctured" blocks from drive 312, result in a propagation of "bad" or "punctured" blocks on drive 314 during the drive rebuild process.

Figure 4:
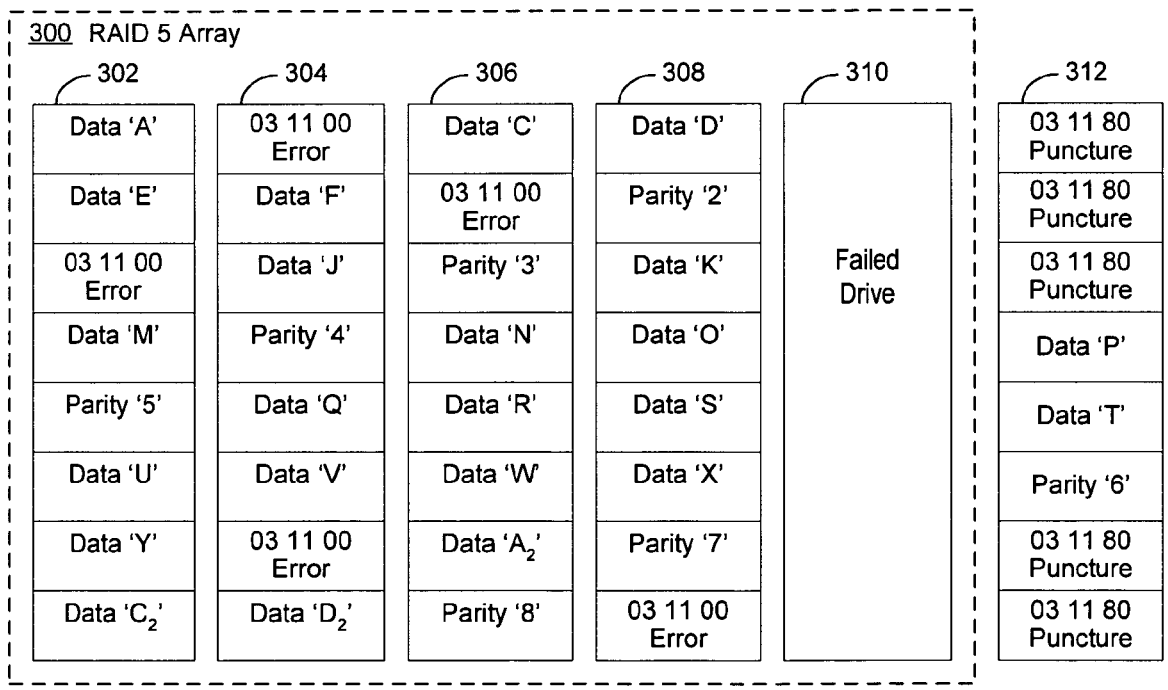
FIG. 4 is a generalized illustration of a RAID 5 subsystem as implemented in an embodiment of the present invention to generate a unique response to logical block failures such that they can be distinguished from media failures by diagnostics or other applications.

FIG. 4 is a generalized illustration of a RAID 5 subsystem 300 as implemented in an embodiment of the present invention to generate a unique response to logical block failures such that they can be distinguished from media failures by diagnostics or other applications. In this illustration, disk 310 in the array has failed and is rebuilt on "hot spare" drive 312 and blocks marked "bad" or "punctured" on drive 312 are validated during the drive rebuild process. Disk 302 comprises data blocks 'A', 'E', 'I', 'M', 'U', 'Y', 'C$_2$' and parity block '5.' Disk 304 comprises data blocks 'B', 'F', 'J', 'Q', 'V', 'Z', 'D$_2$' and parity block '4.' Disk 306 comprises data blocks 'C', 'G', 'N', 'R', 'W', 'A$_2$' and parity blocks '3', '8.'

Disk 308 comprises data blocks 'D', 'K', 'O', 'S', 'X', 'E$_2$' and parity blocks '2', '7.' Disk 312 comprises rebuilt data blocks 'P', 'T' and rebuilt parity blocks '6' with subsequent rebuilt data and parity blocks thereafter. Note that in this same illustration, not only has drive 310 failed, but ECC failures have occurred in data blocks 'B', 'G', 'I', 'Z', and 'E$_2$' causing read errors (e.g., 03 11 00—"disk media error").

In a method of an embodiment of the invention, as failed drive 310 is rebuilt on "hot spare" 312, physical blocks are read on surviving drives 302, 304, 306, 308 and applied against a standard ECC algorithm as commonly used to check RAID blocks. If the data in a physical block passes the standard ECC algorithm, then the block is marked as being "good" and the rebuild process progresses to the next physical block. If the data in the physical block fails to pass the standard ECC test, the read data is written to the corresponding block of "hot spare" drive 312 in a predetermined unique data pattern (e.g., walking bit).

Once the corresponding block is written on "hot spare" drive 312, it is then applied against the PIA. If the data in the physical block fails to pass the PIA, a standard error code (e.g., 03 11 00—"disk media error") is returned and existing media error protocols are then followed. However, if the predetermined data pattern is the physical block passes the PIA, a different error code (e.g., 03 11 80)—"failed via puncture") is returned and the physical block can subsequently be marked as punctured."

Figure 5:
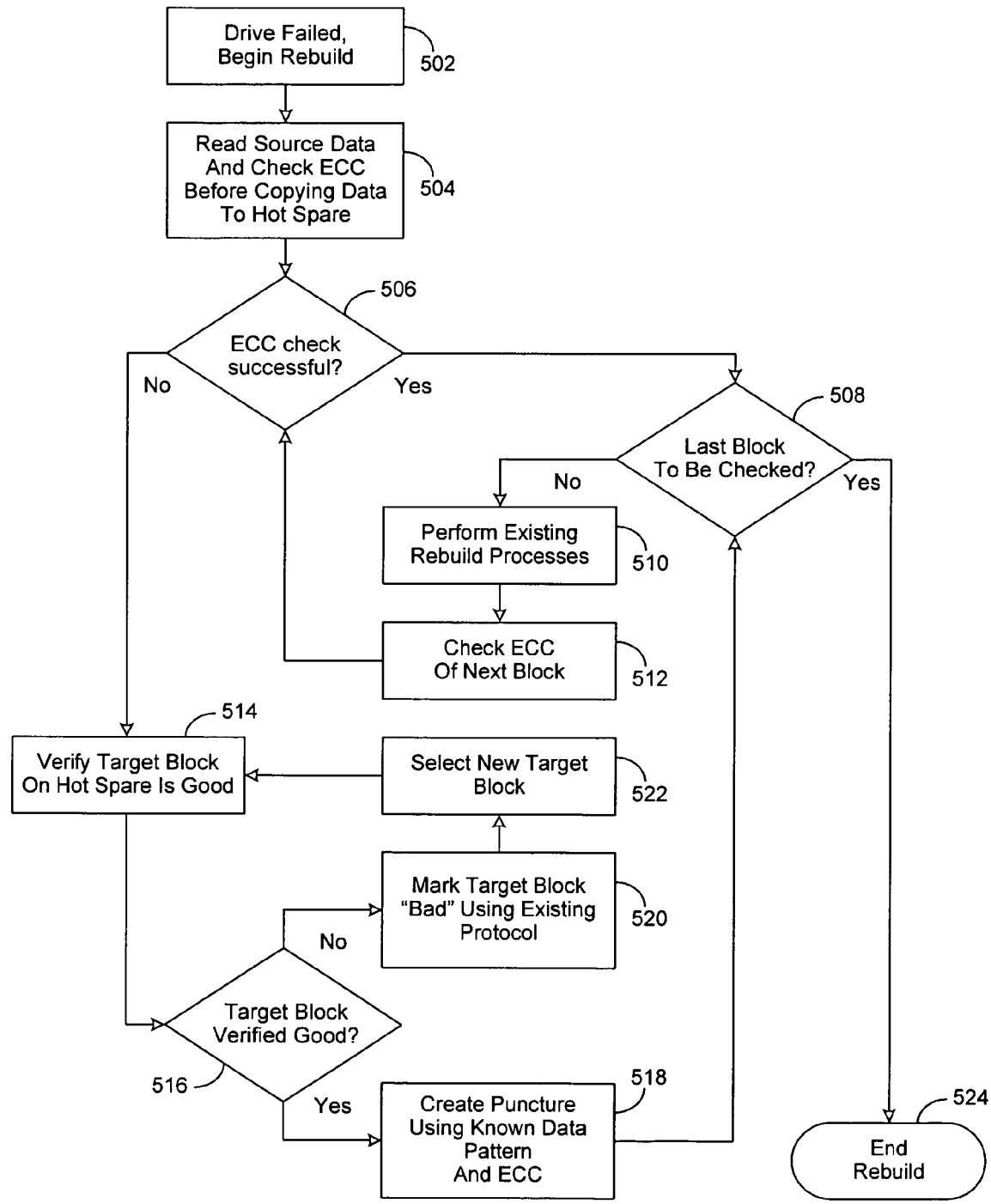
FIG. 5 is a generalized flowchart illustrating one embodiment of the invention as implemented to mark physical blocks on a target drive as "punctured" so they can be verified as being "bad."

FIG. 5 is a generalized flowchart illustrating one embodiment of the present invention as implemented to mark physical blocks on a target drive as "punctured" so they can be verified as being "bad." In Step 502, a drive rebuild process is begun to recover data stored on a failed drive of a RAID subsystem. In Step 504, data from a physical block of the surviving drives of the RAID subsystem is read and an ECC check is performed.

If it is determined in Step 506 that the ECC check was successful, an operation is performed in Step 508 to determine if the current physical block is the last block to be checked. If it is determined in Step 508 that the last physical block has been checked, then rebuild ends in Step 524.

If additional physical blocks are to be checked, existing drive rebuild processes are performed in Step 510. Once existing drive rebuild processes are completed in Step 510, an ECC check is performed on the data of the next physical block in Step 512. If it is determined that the ECC check was not successful in Step 506, READ LONG and WRITE LONG operations are performed on a target block on the hot spare drive in Step 514 to verify whether or not it is "good."

If, in Step 516, the target block on the "hot spare" drive is determined to not be "good," it is marked "bad" using existing protocols in Step 520. Once the original target block has been marked "bad" in Step 520, a new target block is selected in Step 522 and READ LONG and WRITE LONG operations are performed in Step 514 to verify whether or not it is "good."

If, in Step 516, the target block on the "hot spare" drive is determined to be "good," a "puncture" is created on the target block of the "hot spare" drive using a predetermined data pattern or algorithm in Step 518. Once the puncture is created on the "hot spare" drive, an operation is performed in Step 508 to determine if the current physical block is the last block to be checked. If it is determined in Step 508 that the last physical block has been checked, then rebuild ends in Step 524. Otherwise, existing drive rebuild processes continue in Step 510.

Figure 6:
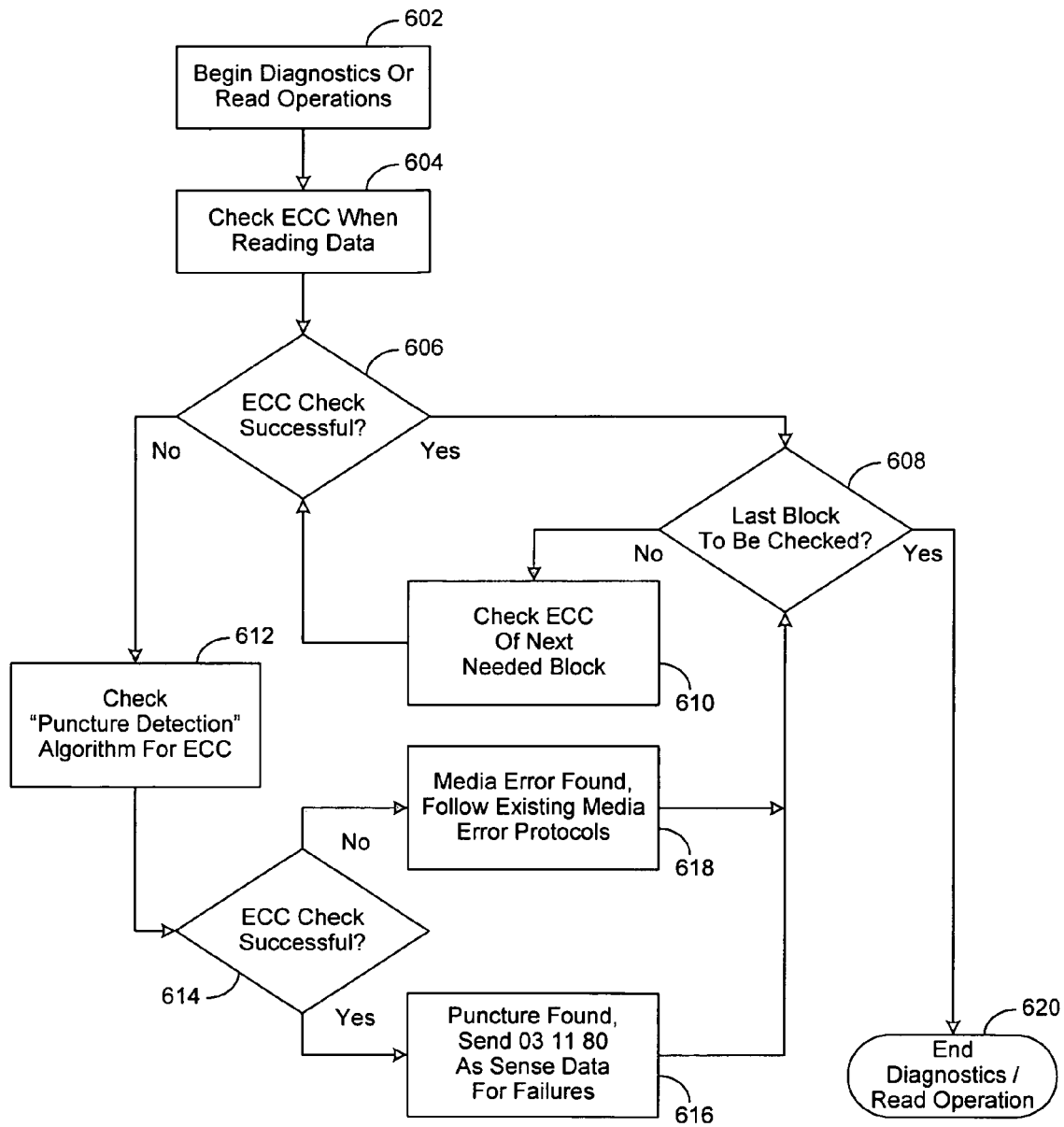
FIG. 6 is a generalized flowchart illustrating one embodiment of the present invention as implemented to diagnose physical blocks on a target drive marked as "punctured" to verify that they have not been erroneously marked as being "bad."

FIG. 6 is a generalized flowchart illustrating one embodiment of the present invention as implemented to diagnose physical blocks on a target drive marked as "punctured," to verify that they have not been marked as being logically "bad." In Step 602, diagnostics or physical block read operations are begun. In Step 604, data from a physical block on the target drive is read and an ECC check is performed.

If it is determined in Step 606 that the ECC check was successful, an operation is performed in Step 608 to determine if the current physical block is the last block to be checked. If it is determined in Step 608 that the last physical block has been checked, then diagnostics are ended in Step 620. If additional physical blocks are to be checked, an ECC check is performed on the data contained by the next physical block in Step 610.

If it is determined that the ECC check was not successful in Step 606, the data contained in the current physical block is applied against a Puncture Identification Algorithm (PIA) in Step 612. If the data contained in the current physical block does not pass the PIA check in Step 614, then the block is marked as "bad" due to finding a disk media error and existing protocols are followed in Step 618.

Once existing media error protocols have been completed in Step 618, an operation is performed in Step 608 to determine if the current physical block is the last one to be diagnosed. If not, diagnostics continue by checking the ECC of the next physical block in Step 610. If the current physical block is the last block to be checked, diagnostics are ended in Step 620.

If the data contained in the current physical block passes the PIA check in Step 614, then an appropriate error code (e.g., 03 11 80—"failed via puncture") is returned and the physical block is marked as "punctured" in Step 616. Once the physical block is marked "punctured" in Step 616, an operation is performed in Step 608 to determine if the physical block is the last one to be diagnosed. If not, diagnostics continue by checking the ECC of the next physical block in Step 610. If the current physical block is the last block to be checked, diagnostics are ended in Step 620.

Skilled practitioners in the art will recognize that many other embodiments and variations of the present invention are possible. In addition, each of the referenced components in this embodiment of the invention may be comprised of a plurality of components, each interacting with the other in a distributed environment. Furthermore, other embodiments of the invention may expand on the referenced embodiment to extend the scale and reach of the system's implementation.

As discussed hereinabove, the present invention provides a system and method for reducing the number of physical blocks marked as "punctured" during a drive rebuild process. Further, use of the present invention can prevent existing drive punctures from needlessly being copied and propagated to new drives. Moreover, the number of misdiagnosed and Can Not Determine (CND) drive failures can be reduced.

Although the present invention has been described in detail, it should be understood that various changes, substitutions and alterations can be made hereto without departing from the spirit and scope of the invention as defined by the appended claims.

What is claimed is:
1. An information handling system, comprising:
a processor operable to process data; and
storage media operable to store data for processing by said processor, said storage media comprising a plurality of storage disks configured in a RAID array;
wherein said processor is operable to detect potential errors in physical data blocks on at least one disk in said RAID array and further operable to conditionally determine if said potential error comprises a puncture error in said disk.

2. The information handling system of claim 1, wherein said potential error is analyzed using first and second error detection algorithms.

3. The information handling system of claim 2, wherein said first error detection algorithm comprises a bad block detection algorithm.

4. The information handling system of claim 3, wherein said second error detection algorithm comprises a puncture identification algorithm.

5. The information handling system of claim 4, wherein data processed by said first and second algorithms indicates a failure of said first algorithm and a failure of said second algorithm.

6. The information handling system of claim 5, wherein the block corresponding to said analyzed data is labeled as a bad block.

7. The information handling system of claim 4, wherein data processed by said first and second algorithms fails said first algorithm and passes said second algorithm.

8. The information handling system of claim 7, wherein the block corresponding to said analyzed data is labeled as a punctured block.

9. The information handling system of claim 4, wherein said puncture identification algorithm comprises a predetermined unique pattern.

10. The information handling system of claim 9, wherein said puncture identification algorithm further comprises a secondary error correcting code algorithm.

11. A method for managing the storage of information on an information handling system, comprising:

storing data on storage media comprising a plurality of storage disks configured in a RAID array; and using a processor to process data on said plurality of storage disks, wherein said processor is operable to detect potential errors in physical data blocks on at least one disk in said RAID array and further operable to conditionally determine if said potential error comprises a puncture error in said disk.

12. The method of claim 11, wherein said potential error is analyzed using first and second error detection algorithms.

13. The method of claim 12, wherein said first error detection algorithm comprises a bad block detection algorithm.

14. The method of claim 13, wherein said second error detection algorithm comprises a puncture identification algorithm.

15. The method of claim 14, wherein data processed by said first and second algorithms indicates a failure of said first algorithm and a failure of said second algorithm.

16. The method of claim 15, wherein the block corresponding to said analyzed data is labeled as a bad block.

17. The method of claim 14, wherein data processed by said first and second algorithms fails said first algorithm and passes said second algorithm.

18. The method of claim 17, wherein the block corresponding to said analyzed data is labeled as a puncture block.

19. The method of claim 14, wherein said puncture identification algorithm comprises a predetermined unique pattern.

20. The method of claim 19, wherein said puncture identification algorithm further comprises a secondary error correcting code algorithm.

* * * * *